Oct. 20, 1931.  R. G. WILLIAMS  1,828,350
FENCE ANCHOR
Filed Dec. 26, 1930
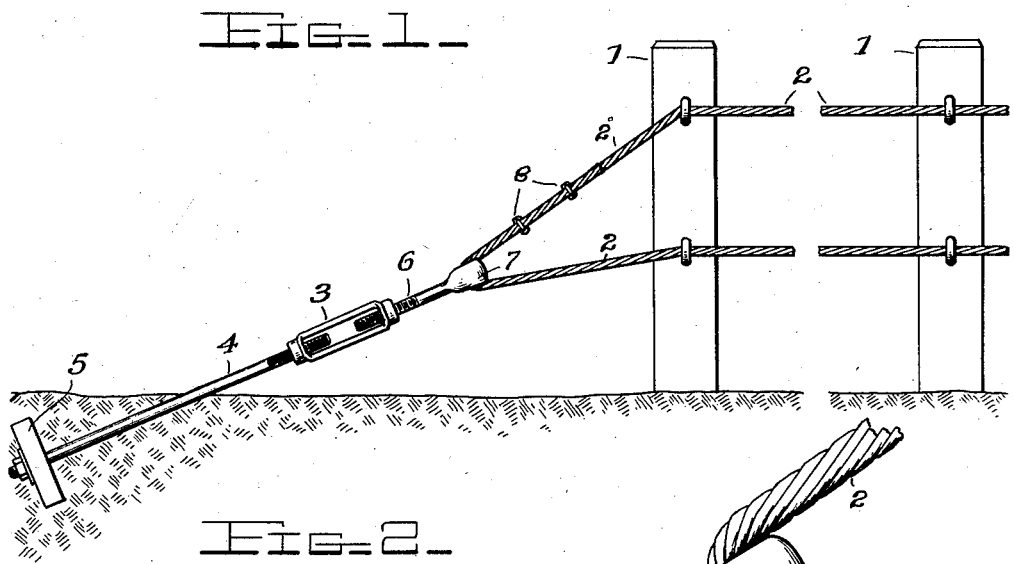
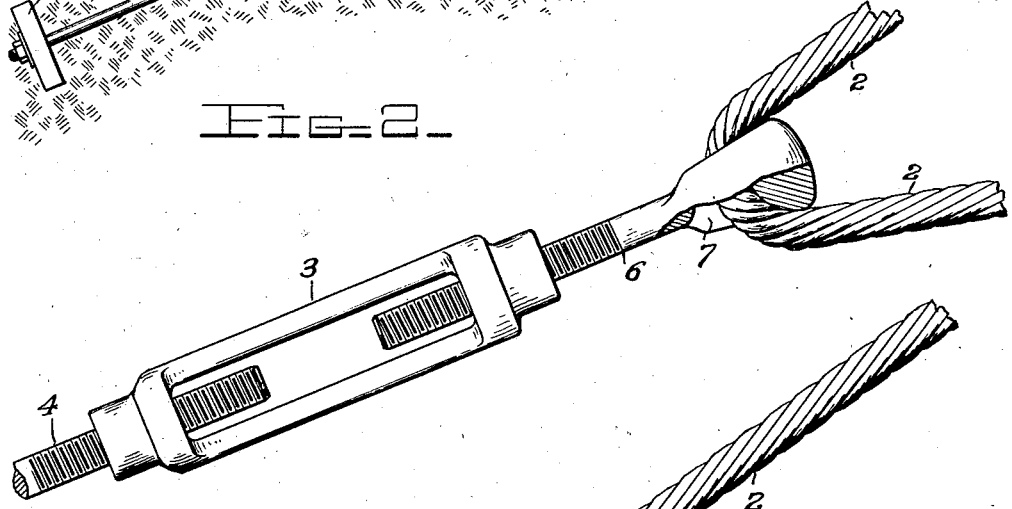
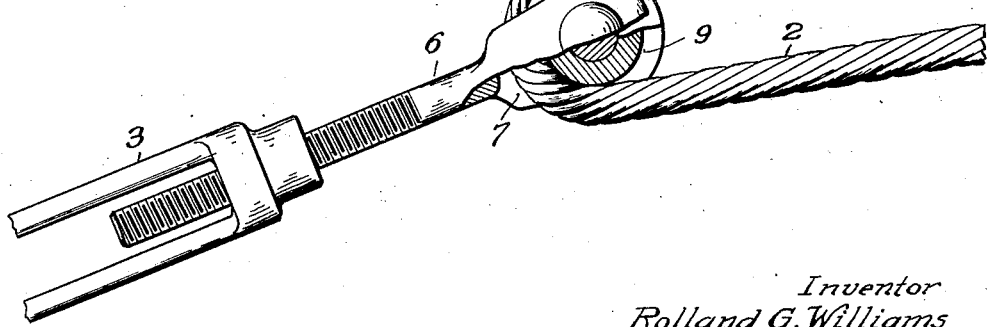
Inventor
Rolland G. Williams
by
Attorney Patented Oct. 20, 1931

1,828,350

UNITED STATES PATENT OFFICE

ROLLAND G. WILLIAMS, OF BRANFORD, CONNECTICUT, ASSIGNOR TO MALLEABLE IRON FITTINGS COMPANY, OF BRANFORD, CONNECTICUT, A CORPORATION OF CONNECTICUT

FENCE ANCHOR

Application filed December 26, 1930. Serial No. 504,908.

My invention relates to means for taking up the slack in the cables of highway guard fences, such slack being the cables at their installment or being caused by the expansion of the cables during the hot weather.

The present invention is identified with cables that are supported by fence posts, the fence proper being in sections from two to three hundred feet in length, and the invention is applied to the cables at the ends of the sections, the cables and anchorages therefor of one section crossing the cables and anchorages of an adjacent section.

Turnbuckles have heretofore been used one for each cable, since the different elevations of the cables when supported by the fence posts, would render the use of a single turnbuckle impractical, because a tension that would take up slack in a lower cable would not take up the slack in a higher cable.

But the present invention aims to utilize a single turnbuckle in the manner hereinafter described and illustrated in the accompanying drawings, in which latter Figure 1 is a side elevation of the end of a section of a highway guard fence equipped with my invention—

Figure 2 is a detail view on an enlarged scale showing the manner of applying my invention, and Figure 3 is a view similar to Figure 2 of a slight modification.

Similar numerals of reference denote like parts in the several figures of the drawings.

1 designates the fence posts, and 2 the cables. 3 is a turnbuckle whose lower end is threaded to a rod 4 that extends at an angle from the usual anchorage 5, the upper end of the turnbuckle being threaded on a rod 6 whose outer end terminates in an eye 7, as shown at Figure 2. One of the cables is passed through this eye 7 and secured to the other cable in any suitable manner, as by clamps 8 shown at Figure 1, so that at their ends the cables are continuous.

When the turnbuckle is operated to tighten the cables the latter will slip through the eye 7 and the slack will be uniformly taken out of both cables, notwithstanding the fact that the distance between the eye 7 and the point of attachment of the upper cable to the post is greater than the distance between said eye and the point of attachment of the lower cable to the post.

In order to cause the cables to run more freely through the eye when the turnbuckle is operated, the cables may pass around a pulley 9 journaled at the outer end of the eye portion of the rod 6.

What is claimed is:

In a highway guard fence means for taking up the slack in the cables at the end posts of sections thereof comprising a turnbuckle, an anchoring rod extending in the ground angularly positioned with respect to the end posts, a rod extending from said anchorage and threaded into the lower end of said turnbuckle, and a rod threaded into the upper end of said turnbuckle and terminating in an eye, the ends of said cables being secured together and passing freely through said eye.

In testimony whereof I affix my signature hereto.

ROLLAND G. WILLIAMS.